United States Patent [19]

Mizen et al.

[11] 3,990,749

[45] Nov. 9, 1976

[54] INERTIA ACTUATED SERVOMOTOR FOR A TRAILER

[75] Inventors: Walter J. Mizen; Richard T. Hendrickson; Henry Dorsett, all of South Bend, Ind.

[73] Assignee: The Bendix Corporation, South Bend, Ind.

[22] Filed: Dec. 24, 1975

[21] Appl. No.: 644,226

[52] U.S. Cl. .............................. 303/24 A; 188/112; 303/7
[51] Int. Cl.² .......................................... B60T 13/08
[58] Field of Search ............ 188/3 R, 3 H, 112, 141, 188/142, 181 A; 303/7, 31, 24 A

[56] References Cited
UNITED STATES PATENTS

| | | | |
|---|---|---|---|
| 2,279,732 | 4/1942 | Brewer | 303/24 A X |
| 3,600,042 | 8/1971 | Cripe | 303/24 A X |
| 3,834,767 | 9/1974 | Bullinger | 188/112 X |
| 3,948,566 | 4/1976 | Salam | 303/7 |

Primary Examiner—Duane A. Reger
Attorney, Agent, or Firm—Leo H. McCormick, Jr.; Ken C. Decker

[57] ABSTRACT

A tow vehicle-trailer braking system having independently operated tow vehicle and trailer brakes. The tow vehicle brakes are actuated by a master cylinder. The master cylinder is responsive to an input force supplied by an operator. When the tow vehicle brakes are actuated, a deceleration force will be created in the tow vehicle. The trailer brakes are operated by a servomotor. The servomotor has a pivotally positioned lever arm on which an adjustable weight is located. The weight is moved in response to the deceleration force created by the tow vehicle. The weight pivots the lever around a pin and supplies a control valve in the servomotor with an input force to independently operate the wheel brakes in the trailer.

10 Claims, 1 Drawing Figure

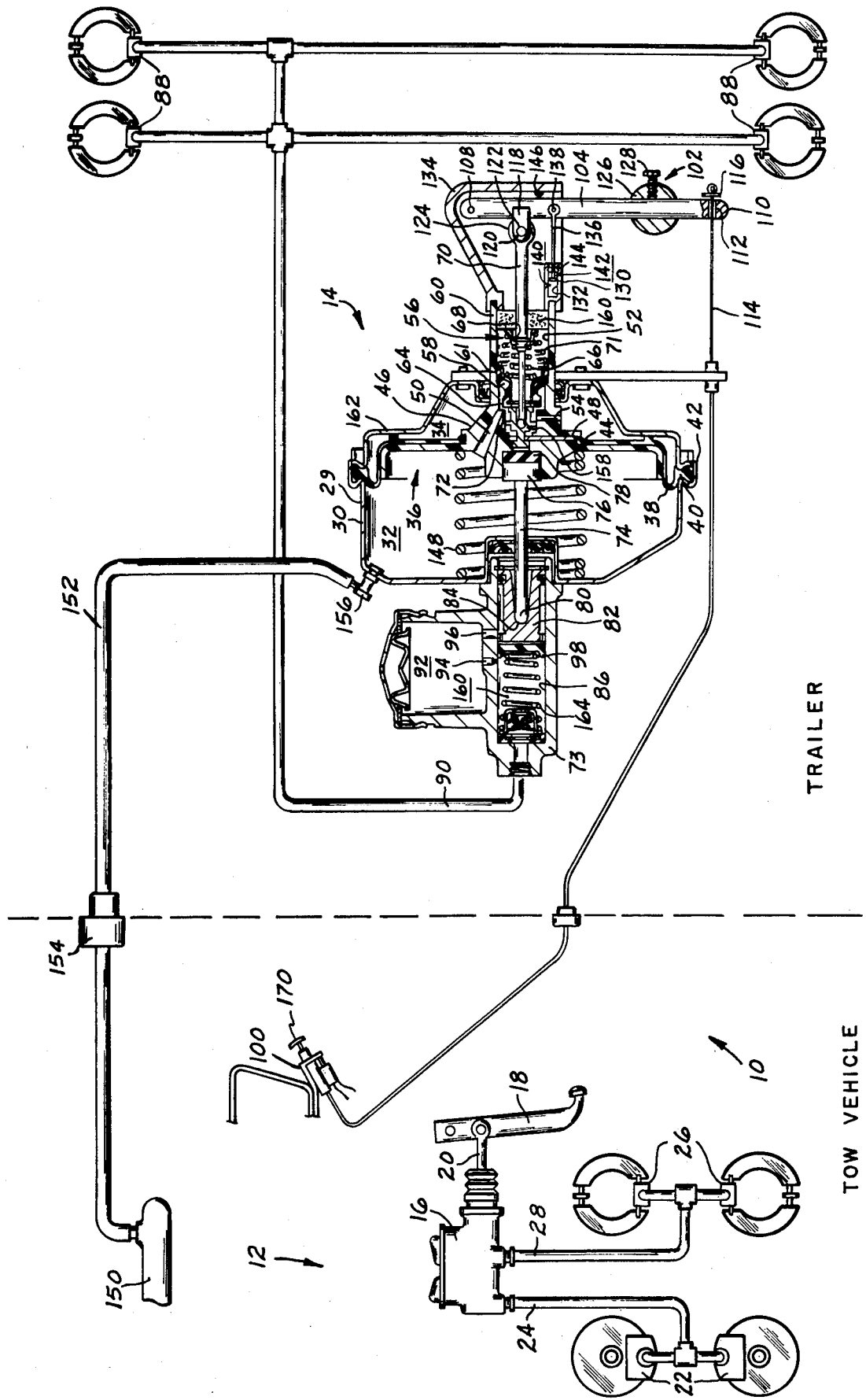

INERTIA ACTUATED SERVOMOTOR FOR A TRAILER

BACKGROUND OF THE INVENTION

Various means have been proposed in the prior art for providing a tow vehicle-trailer combination with an independent braking system. The following prior art patents are illustrative of various trailer braking systems commonly utilized by the industry.

In U.S. Pat. No. 3,790,807, the actuation of the brakes in the trailer is dependent upon the creation of an electrical signal by a transponder connected to receive hydraulic pressure from the master cylinder. The electrical signal is amplified and will actuate a solenoid valve to operate a servomotor in the trailer in synchronization with a braking force supplied the wheel brakes in the tow vehicle.

In U.S. Pat. No. 3,856,363, the actuation of the brakes in the trailer is dependent upon the creation of a pneumatic signal in the tow vehicle. The pneumatic signal is transmitted through a conduit to operate a servomotor in the trailer in synchronization with the actuation force which operates the wheel brakes in the tow vehicle.

In U.S. Pat. No. 3,880,263, the actuation of the brakes in the trailer is dependent upon a difference in the rate of deceleration between the tow vehicle and the trailer. The differential in the rate of deceleration is utilized to compress a piston in a master cylinder associated with the tongue connector of the trailer. The master cylinder supplies the wheel brakes in the trailer with an actuation force.

In some applications, the cost of providing an electrical transducer means as taught by U.S. Pat. No. 3,790,807, a pneumatic signal producer, as taught by U.S. Pat. No. 3,856,363, and a tongue with an integral master cylinder as taught in U.S. Pat. No. 3,880,263 is not justified because of the type and use of the trailer.

SUMMARY OF THE INVENTION

We have devised a tow vehicle-trailer braking system whereby the deceleration force produced by the tow vehicle is utilized to actuate a servomotor in the trailer. The servomotor will generate a force to operate the trailer brakes and bring the trailer to a stop. The braking system in the tow vehicle is completely independent of that in the trailer. The servomotor in the trailer braking system has a lever arm which is pivotally attached to a housing in the trailer. A mass means is located on the free end of the lever arm. The lever arm is connected to a push rod which operates the control valve in the servomotor. When a deceleration force is created in the tow vehicle, the mass means rotates the lever around a pivotal connection and supplies the push rod with a linear force to move the control valve and actuate the servomotor. The actuated servomotor generates a braking force to operate the wheel brakes in the trailer.

It is therefore the object of this invention to provide a tow vehicle-trailer braking system with a servomotor for use in the trailer having a control means which is actuated by deceleration forces developed by the tow vehicle.

It is another object of this invention to provide a servomotor with a control valve which is actuated by a lever means which is moved around a pivot point by a deceleration force created in a tow vehicle.

It is a further object of this invention to provide a trailer with a servomotor having a deceleration responsive valve for independently operating the wheel brakes in the trailer.

These and other objects will become apparent from reading this specification and viewing the drawings.

BRIEF DESCRIPTION OF THE DRAWING

In the drawing, a tow vehicle-trailer braking system is schematically illustrated with a section view of a servomotor located in the trailer having a control means which is activated by deceleration forces developed in the tow vehicle.

DETAILED DESCRIPTION OF THE PREFERRED EMBODIMENT

In the tow vehicle-trailer braking system 10 shown in the drawing, the brake actuator means 12 in the tow vehicle is completely independent from a brake actuator means 14 located in the trailer.

The brake actuator means 12 in the tow vehicle has a master cylinder 16 through which a brake pedal 18 is connected by push rod 20. The master cylinder 16 is connected by conduit 24 to the front wheel brakes 22 and by conduit 28 to the rear wheel brakes 26.

The brake actuator means 14 in the trailer has a servomotor 29 with a housing 30. The housing 30 has a cavity therein divided into a front chamber 32 and a rear chamber 34 by a wall means 36. The wall means 36 has a diaphragm 38 with a first bead 40 held by a twist lock connector 42 to the housing 30 and a second bead 44 located in a groove 48 in a hub means 46. The hub means 46 has a first passageway 50 which connects the front chamber 32 with an axial bore 52 in the hub means 46. A second passageway 54 in the hub means 46 connects the axial bore 52 with the rear chamber 34. A valve means 56 located in the axial bore 52 controls the communication of vacuum from the front chamber 32 into the rear chamber 34. The valve means 56 has a poppet 58 with a first end 61, fixed to a rearwardly projecting boss 60 on the hub means 46, and a second end 64, which is free to move in the axial bore 52. A first spring 66 is located between a shoulder 68 on push rod 70 and the second end 64 of the poppet 58. A second spring 71, located between the first end 61 of the poppet 58 and the shoulder 68, urges push rod 70 toward a rest position whereby vacuum is freely communicated past seat 72, through the second passageway 50 in bore 52 and into the rear chamber 34.

The wall means 36 is connected to a master cylinder 73 through a push rod 74. The push rod 74 has a face 76 positioned in the bore 52 adjacent reaction disc 78 and a head 80 which extends into a recess 84 in piston 82 of the master cylinder 73. The piston 82 is adapted to move in a bore 86 and generates a hydraulic fluid force which is distributed through conduit 90 to operate the wheel brakes 88 of the trailer. The bore 86 is connected to a reservoir 92 through a compensator port 94 and a relief port 96. Face 98 on the piston 82 segregates the compensator port 94 from the relief port 96. Compensator port 94 allows free communication of hydraulic fluid from reservoir 92 to bore 86.

The operational force through which the piston means 82 is moved in the bore 86, will be initiated by movement of push rod 70. Movement of the push rod 70 can occur either by manual actuation through the hand control 100 located in the tow vehicle or through the rotation of mass means 102 responding to a deceleration force created by the operation of the brake actuator means 12 in the tow vehicle.

The hand control 100 is connected to a lever 104 of the mass means 102. The lever 104 has a first end 106 pivotally located on pin 108 and a second end 110 which is free to move. The second end 110 has a slot 112 in which a wire 114 from the hand control 100 is loosely positioned. A fastener 116 attached to the wire 114 forms a stop which prevents the lever 104 from moving past a fixed release position. The lever 104 is connected to the push rod 70 through a u-shaped member 118. The u-shaped member 118 has a first arm 120 and a second arm (not shown in the drawing) which extend around end 124 of the push rod 70. A pin 122, which extends through the first arm 120 and the second arm (not shown), allows end 124 of the push rod 70 to pivot with respect to the lever 104.

A weight 126 is located on the lever 104 between the connection of the push rod 70 and the second end 110 of the lever 104. A bolt or set screw 128 is threadably connected to the weight 126 to provide a means of adjusting the position of the weight 126 on the lever arm 104 and thereby permit a modification of the effect of deceleration force on the lever 104.

A dampener means 129 attached to the lever 104 has a plunger 130 located in bore 132 of shroud 134. A stem 136 attached to the plunger 130 is pivotally connected to pin 138 on the lever 104. The bore 132 has a diameter which is larger than the plunger 130 to allow restricted communication between a first chamber 140 and a second chamber 142. A cap 144 surrounds the stem 136 and in some instances prevents communication between the second chamber 142 and the atmosphere.

The shroud 134 is attached to the housing 60. The shroud 134 will protect the valve means 56 and the connection for the actuator mass means 102 from being interferred with by outside elements. A rubber bumper 146 on the shroud 134 provides a stop for the lever 104 when valve return spring 71 and return spring 148 move the valve means 56 and the wall means 36 to a rest position.

MODE OF OPERATION OF THE PREFERRED EMBODIMENT

When the vehicle is operating, vacuum produced at the vehicle engine intake manifold 150 will be communicated into front chamber 32 of servomotor 29 through conduit 152, disconnect coupling 154, and check valve 156. With vacuum in the front chamber 32, any air present in the rear chamber 34 will flow through passage 54 into the axial bore 52, past seat 72, into passage 50, and into the front chamber 32 for communication to the intake manifold 150.

When the operator of the tow vehicle-trailer combination desires to stop or decelerate, an input force is applied to brake pedal 18, which moves the push rod 20 to generate a hydraulic fluid pressure in the master cylinder 16 to operate the front wheel brakes 22 and the rear wheel brakes 26. With the front brakes 22 and the rear brakes 26 in operation, a deceleration force will be created in the tow vehicle.

This deceleration force initiated by the tow vehicle acts on the weight 126 and causes the lever 104 to rotate around pin 108. When lever 104 rotates around pin 108, a linear input force will be transmitted through push rod 70 to initially allow spring 66 to seat the second end 64 of the poppet 58 on seat 72 and interrupt vacuum communication between passage 50 and the axial bore 52. Further movement of the push rod 70 moves the plunger 158 away from the second end 64 of the poppet means 58 and allows air to flow through filter 160 into the axial bore 52 for communication into the rear chamber 34 through passage 54. With air in the rear chamber 34 and vacuum in the front chamber 32 a pressure differential develops across the wall means 36. This pressure differential develops an output force which is transmitted through push rod 74 to move the piston 82 as the wall means 36 is moved. When piston 82 initially moves, face 98 will interrupt communication between compensator port 94 and bore 86 to establish a pressurizing chamber 160 in the master cylinder 73. Further movement of the piston 82 generates a hydraulic fluid pressure for communication to the wheel brakes 88 in the trailer and provides a braking force therein for stopping the trailer.

The deceleration force terminates when the operator terminates the input force on brake pedal 18. When the deceleration force terminates, weight 126 moves lever 104 toward stop 146. When lever 104 is moved toward the stop 146, push rod 70 will initially move plunger 158 against the second end 64 of the poppet 58 to interrupt the communication of air into the rear chamber 34 through passageway 54 and thereafter move the second end 64 away from seat 72 to allow vacuum in the front chamber 32 to be communicated into the rear chamber through the axial bore 52. As the vacuum replaces the air in the rear chamber 34, return spring 148 moves wall means 36 toward bumper 162 and allows return spring 164 to position piston 82 at a rest position in the master cylinder 73 to terminate the hydraulic fluid pressure being communicated to operate the wheel brakes 88.

If the operator finds that the actuation of the valve means 56 is too slow or too fast, the weight 126 can be adjusted on the lever 104 to modify the effect of the deceleration force. The deceleration force provides the motive force for moving the lever arm 104.

When lever 104 is moved by the deceleration force, piston 130 dampens any erratic motion in the lever arm 104. In some applications, the fluid in bore 132 can be air. However, in most applications, it is anticipated that bore 132 will be filled with hydraulic fluid. The hydraulic fluid is required to flow between the plunger or piston 130 and the bore 132 before the lever arm 104 can move the push rod 70 in either direction.

Often times an operator may desire to manually apply the wheel brakes 88 in the trailer independent to development of any deceleration force in the tow vehicle. To accomplish independent trailer brake application, knob 170 of the hand control means 100 is pulled to move wire 114. When wire 114 is moved, fastener 116 will engage the lever arm 104 and cause the same to pivot around pin 108 to provide a linear input to valve means 58. This linear input to valve means 58 actuates the servomotor means 14 and supplies the wheel brakes 88 with a corresponding actuation signal which causes the trailer to decelerate and eventually stop. It is also envisioned that this type of manual actuation may be most important when both the tow vehicle and the trailer are stopped as at a stoplight on a steep incline. This allows the operator to start the tow vehicle without slipping the clutch since manual release of the knob 170 allows the return springs 164, 148 and 71 to reposition the lever 104 against the bumper 146 in synchronization with the clutch release.

It should also be noted that the manual control wire 114 will not have an effect upon the movement of the lever 104 by the deceleration force since slot 112 allows end 110 to move without engagement.

Thus, we have provided a braking system which will provide a trailer with an independent operation without being connected to the operation of the tow vehicle.

We claim:

1. In a tow vehicle-trailer braking system having a brake actuator means responsive to an operator input for establishing a first braking force to operate the wheel brakes in the tow vehicle and develop a deceleration force and a servomotor means in the trailer responsive to said deceleration force for establishing a second braking force which will activate the wheel brakes in the trailer, said servomotor means comprising:

a first housing having a bore therein with a compensator port connected to a hydraulic reservoir, and an outlet port connected to the wheel brakes in the trailer, piston means located in said bore having a face section for segregating the compensator port from the bore;

force transmitting means connected to said piston means;

lever means having a first end pivotally located on a pin and a second end, said force transmitting means being connected between the first end and the second end and said lever means; and mass means connected to said second end of the lever means and responsive to said deceleration force for rotating the lever means around the pin to translate a linear force through the force transmitting means and move the piston means past the compensator port to pressurize hydraulic fluid in the bore and supply the wheel brakes in the trailer with an operational force as a function of the deceleration force in the tow vehicle.

2. The tow vehicle-trailer braking system as recited in claim 1 wherein said mass means includes:

weight means surrounding the lever means.

3. The tow vehicle-trailer braking system, as recited in claim 2, wherein said force transmitting means includes:

dampening means connected to said lever means for modifying the rate of rotation of the lever means by the weight means to attenuate modulation of the weight means and prevent erratic movement of the piston means by the force transmitting means.

4. The tow vehicle-trailer braking system, as recited in claim 2, wherein said force transmitting means includes:

a second housing having a cavity therein, wall means for dividing the cavity into a first chamber and a second chamber, said wall means having a passageway for connecting the first chamber with the second chamber, said first chamber being connected to a source of vacuum for evacuating air from the first chamber and said second chamber;

control valve means connected to said lever means and said wall means for interrupting the communication of vacuum through said passageway and allowing air to enter into the second chamber and develop a pressure differential with vacuum in the front chamber, said pressure differential moving the wall means and transmitting an output force through a linkage to move the piston means in the bore of the first housing and generate pressurized hydraulic fluid therein.

5. The tow vehicle-trailer braking system, as recited in claim 4, further including:

hand control means extending from the tow vehicle to the trailer, said hand control being connected to the second end of the lever means, said hand control means being responsive to an operator for moving the lever means around the pin to supply the control valve means with an independent operational force.

6. The tow vehicle-trailer braking system, as recited in claim 5, wherein said lever means further includes:

slot means located adjacent said second end for allowing said lever means to freely rotate around said pin in response to said deceleration force without interference from said hand control means.

7. The tow vehicle-trailer braking system, as recited in claim 3, wherein said dampening means includes:

a third housing having an axial bore therein;

plunger means loosely located in the axial bore; and push rod means pivotally attached to said lever means, said lever means acting on said push rod means to move said plunger means in opposition to dampening fluid in said axial bore, said dampening fluid upon flowing between the plunger means and said axial bore terminating the resistance to movement of the plunger means.

8. The tow vehicle-trailer braking system, as recited in claim 7, wherein said dampening means further includes:

end cap means surrounding said push rod means and connected to said third housing for retaining said dampening fluid in said axial bore.

9. The tow vehicle-trailer braking system, as recited in claim 8, wherein said third housing further includes:

shroud means attached to the second housing and surrounding the lever means, said shroud means providing a stop to establish a rest position for the lever means.

10. The tow vehicle-trailer braking system as recited in claim 2, wherein said mass means further includes:

adjustable means for moving the weight means on the lever means between the force transmitting connection and the second end to change the amplification of the deceleration force acting on the force transmitting means.

* * * * *